US008201630B2

(12) United States Patent
Welton

(10) Patent No.: US 8,201,630 B2
(45) Date of Patent: Jun. 19, 2012

(54) METHODS OF USING HYDROCARBON GELLING AGENTS AS SELF-DIVERTING SCALE INHIBITORS

(75) Inventor: Thomas D. Welton, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 337 days.

(21) Appl. No.: 12/608,257

(22) Filed: Oct. 29, 2009

(65) Prior Publication Data

US 2011/0100629 A1 May 5, 2011

(51) Int. Cl.
*E21B 43/16* (2006.01)
*E21B 43/04* (2006.01)

(52) U.S. Cl. .................... 166/305.1; 166/278; 166/308.4

(58) Field of Classification Search ........................ None
See application file for complete search history.

(56) References Cited

U.S. PATENT DOCUMENTS

| | | | | |
|---|---|---|---|---|
| 3,798,162 A | | 3/1974 | Dickert, Jr. | 508/362 |
| 4,003,393 A | | 1/1977 | Jaggard | 137/15.07 |
| 4,473,408 A | | 9/1984 | Purinton | 134/8 |
| 5,034,139 A | | 7/1991 | Reid | 507/119 |
| 5,089,150 A | * | 2/1992 | Hen | 507/221 |
| 5,271,464 A | | 12/1993 | McCabe | 166/295 |
| 5,846,915 A | * | 12/1998 | Smith et al. | 507/269 |
| 6,283,215 B1 | | 9/2001 | Kohler | 166/302 |
| 6,544,934 B2 | | 4/2003 | Taylor | 507/238 |
| 7,314,850 B2 | | 1/2008 | Taylor | 507/238 |
| 7,328,744 B2 | | 2/2008 | Taylor | 166/279 |
| 2009/0163389 A1 | * | 6/2009 | De Campo et al. | 507/218 |

OTHER PUBLICATIONS

"Gelled Scale Inhibitor Treatment for Improved Placement in Long Horizontal Wells at Norne and Heidrun Fields," by Olav Martin Selle, et al., as published in the 2008 by the Society of Petroleum Engineers (SPE 112464), Feb. 2008.

"Potential Application of Viscosified Treatment Fluids for Improved Bullhead Scale Inhibitor Placement in Long Horizontal Wells—A theoretical and Laboratory Examination," by R Stalker, et al., as published in the 2004 by the Society of Petroleum Engineers (SPE 87439), May 2004.

* cited by examiner

*Primary Examiner* — Angela M DiTrani

(74) *Attorney, Agent, or Firm* — Robert A. Kent; McDermott Will & Emery LLP

(57) ABSTRACT

Method of treating a subterranean formation using a hydrocarbon treatment fluid using a phosphor-based hydrocarbon gelling agent that is capable of both increasing the viscosity of the hydrocarbon treatment fluid and remaining in the subterranean formation after the viscosity of the gel is broken such that it can act as a scale inhibitor. Phosphor-based hydrocarbon gelling agents may be formed from a polyvalent metal salt of an organophosphonic acid ester or from a polyvalent metal salt of an organophosphinic acid.

19 Claims, 1 Drawing Sheet

Instantaneous Scale Formation Test Results

Normalized % turbidity: 100.0, 90.0, 80.0, 70.0, 60.0

Time (minutes): 0, 2, 4, 6, 8, 10, 12, 14, 16

Miller Brine (no inhibitor)
Miller Brine with ethyl octanephosphonic acid

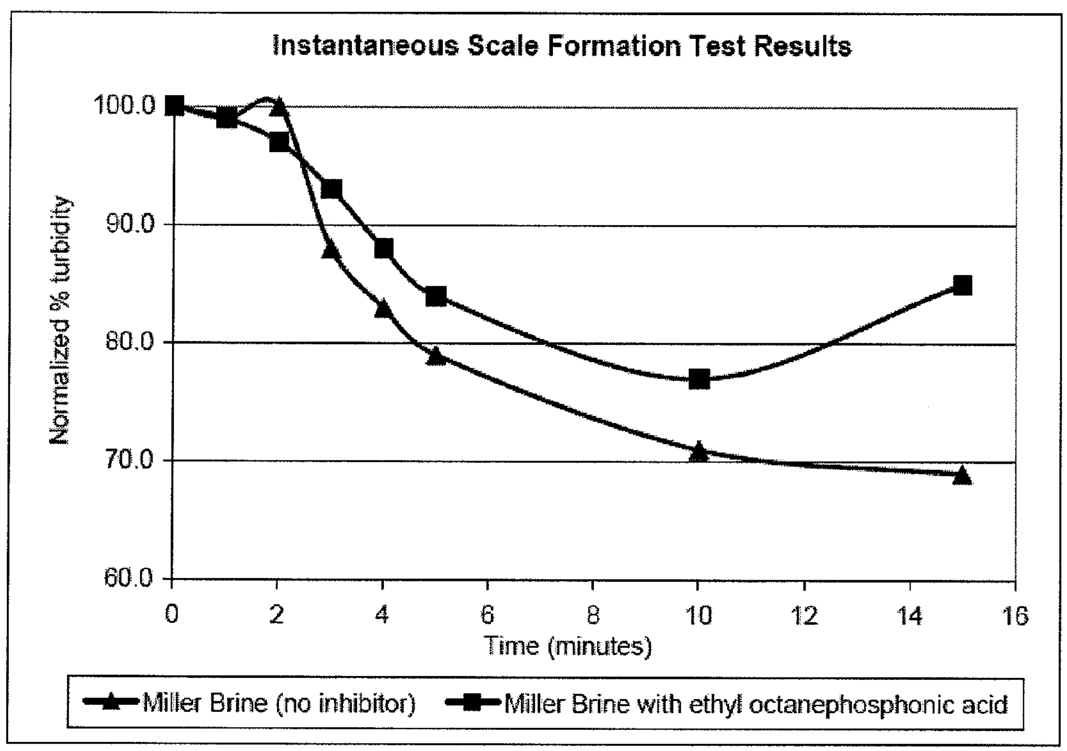
Instantaneous Scale Formation Test Results
100.0
90.0
80.0
70.0
60.0
Normalized % turbidity
0
2
4
6
8
10
12
14
16
Time (minutes)
Miller Brine (no inhibitor)
Miller Brine with ethyl octanephosphonic acid

METHODS OF USING HYDROCARBON GELLING AGENTS AS SELF-DIVERTING SCALE INHIBITORS

BACKGROUND OF THE INVENTION

This invention relates to the use of phosphor-based hydrocarbon gelling agents as self-diverting scale inhibitors.

Gelled liquid hydrocarbon fluids have been used in treating subterranean formations penetrated by well bores, e.g., for stimulation or sand control treatments such as fracturing or gravel packing, respectively. In fracturing treatments, a gelled liquid hydrocarbon fracturing fluid that may comprise particulate material, often referred to as proppant, e.g., sand, suspended therein is pumped through a well bore into a subterranean formation at a rate and pressure such that one or more fractures are formed or enhanced in a portion of the formation. Proppant material may be deposited in the fractures to, among other things, prevent the formed fractures from closing, so as to create or maintain conductive channels through which produced fluids may flow to the well bore. At a desired time, the viscosity of the gelled liquid hydrocarbon fluid may be reduced, or "broken", and the fluid may be recovered.

Similarly, sand control operations, such as gravel packing, use gelled liquid hydrocarbon fluids, often referred to as gravel pack fluids. Gravel pack fluids are often used to suspend gravel particles for delivery to a desired area in a well bore, e.g., near unconsolidated or weakly consolidated formation particulates, to form a gravel pack to enhance sand control. One common type of gravel packing operation involves placing a gravel pack screen in the well bore and packing the annulus between the screen and the well bore with gravel of a specific size designed to prevent the passage of formation sand. The gravel, among other things, acts to prevent the particulates from occluding the screen or migrating with the produced fluids, and the screen, among other things, acts to prevent the gravel from entering the production tubing. Once the gravel pack is substantially in place, the viscosity of the gravel pack fluid often may be reduced and produced back from the well bore.

Oil-soluble phosphonate compounds, such as polyvalent metal salts of orthophosphonic acid esters have been described for use as gelling agents for forming high-viscosity gelled liquid hydrocarbon treatment fluids. Such gelled liquid hydrocarbon treatment fluids often have included particulate materials such as proppant or gravel, and oftentimes delayed breakers for causing the treatment fluids to break into relatively thin fluids so that the treatment fluids may be produced back. Descriptions of such high-viscosity gelled liquid hydrocarbon treatment fluids and methods of their use are set forth at least in part in U.S. Pat. Nos. 7,328,744, and 6,544,934, and 7,314,850.

Often, subterranean formations and wells that are treated using gelled hydrocarbon fluids contain not only desirable hydrocarbons, but also waters and brines. The handling of such water and brines produced from subterranean formations can present severe scale formation problems. For example, when brines are produced from oil wells that contain scale forming compounds, changes in temperature, pressure and other physical conditions of the brines as they are produced causes the precipitation and deposition of scale in the producing formation, flow lines, separators and other producing and handling equipment. In addition, scale formation can occur when two or more different brines mix. Scale formation on the equipment used to extract oil from the field is highly problematic, particularly on the interior surfaces of production tubing and at the perforations in the wall of the casing itself. Scale formation can greatly reduce the production capacity of a subterranean well.

There are several conventional techniques to counter the problem of oil field scale formation, all of which bear significant disadvantages. The technique of "downhole squeezing" is commonly used, wherein inhibitor chemicals in aqueous solution are injected into the near-wellbore area. A typical squeeze in a well will comprise a preflush, a squeeze pill, and an overflush treatment before the well is returned to normal function. The preflush, which may be comprised of a mixture of surfactant/de-emulsifier solution, stops the formation of emulsions that would block the perforation pores and may wet (with water) formation surfaces. The squeeze pill itself typically involves injection of inhibitor as a 1-20% solution in water, causing saturation of the matrix in a radial area around the well. The overflush comprises a displacement of the squeeze pill that propels the chemical out from the well bore in a wider circumference so that a significant portion of the surrounding surface of rock matrix is exposed to the inhibitor compound.

One known disadvantage to the downhole squeeze method is that when the pressure applied down the well is reversed, a significant portion of the inhibitor chemical is often immediately flushed from the rock. The remaining solution adsorbs to the rock surface and acts to inhibit scale formation by constant treatment as fluid passes through the rock formation into the well conduit. However, over time the inhibitor is gradually washed from the rock surface as fluid production continues until a further de-scaling treatment is required. Another disadvantage is the time and equipment needed to perform the downhole squeeze operation. Another disadvantage is that the squeeze may not be placed in the zones of interest creating an inferior end result.

SUMMARY OF THE INVENTION

This invention relates to the use of phosphor-based hydrocarbon gelling agents as self-diverting scale inhibitors.

A method of inhibiting scale formation comprising: providing a gelled liquid hydrocarbon treatment fluid comprising a liquid hydrocarbon and a phosphor-based hydrocarbon gelling agent; placing the treatment fluid into a portion of a subterranean formation wherein at least a portion of the placement is performed at matrix flow rates; and, allowing at least a portion of the phosphor-based hydrocarbon gelling agent to remain in the subterranean formation wherein the phosphor-based hydrocarbon gelling agent then acts to reduce the formation of scale.

Other features and advantages of the present invention will be readily apparent to those skilled in the art upon a reading of the description of preferred embodiments which follows.

BRIEF DESCRIPTION OF DRAWINGS

FIG. 1 displays instantaneous scale formation test results.

DESCRIPTION OF PREFERRED EMBODIMENTS

This invention relates to the use of phosphor-based hydrocarbon gelling agents as self-diverting scale inhibitors. These self-diverting scale inhibitors of the present invention are suitable for use in subterranean treatment operations, such as subterranean stimulation (such as fracturing) as well as sand control treatments (such as gravel packing) that may be carried out in subterranean formations.

The gelled liquid hydrocarbon compositions of the present invention comprise a phosphor-based hydrocarbon gelling agent that comprises a polyvalent metal salt of an organophosphonic acid ester or a polyvalent metal salt of an organophosphinic acid. The term "salt" as used herein refers to polyvalent metal ion salts that can be formed directly from an organophosphonic acid ester (or an organophosphinic acid) by a metathesis reaction comprising an alkali metal or ammonium salt of the organophosphonic acid ester (or the organophosphinic acid), or by a metathesis reaction comprising an organophosphonic acid dialkyl ester (or organophosphinic acid alkyl ester). Optionally, the gelling agents of the present invention may comprise water and/or a base if desired.

Suitable organophosphonic acid esters have the formula:

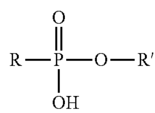

wherein R comprises a hydrocarbon group having from about 1 to about 30 carbon atoms that, for example, may comprise a linear or branched alkyl, alkenyl, aryl, alkylaryl, arylalkyl, cycloalkyl, alkyl ether, aryl ether, alkyl aryl ether, or a mixture thereof; and R' comprises a hydrocarbon group having from about 1 to about 6 carbon atoms. If R is a relatively small group, then R' may comprise a larger hydrocarbon group similar to that listed above with respect to R such as linear or branched alkyl, alkenyl, aryl, alkylaryl, arylalkyl, cycloalkyl, alkyl ether, aryl ether, alkyl aryl ether group, or a mixture thereof that may have about 1 to about 30 carbon atoms. In choosing a suitable R and R', one should be mindful that if R and R' are both relatively bulky groups (e.g., if R and R' are both 2-ethylhexyl groups), then an adequate gelled liquid hydrocarbon may not form. Techniques that can be used for the preparation of organophosphonic acid esters useful in accordance with this invention include, for example, those described in U.S. Pat. No. 3,798,162, the relevant disclosure of which is incorporated herein by reference.

Suitable organophosphinic acids have the formula:

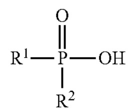

wherein $R^1$ may comprise a linear or branched hydrocarbon group having from about 1 to 30 carbon atoms that, for example, may comprise a linear or branched alkyl, alkenyl, aryl, alkylaryl, arylalkyl, cycloalkyl, alkyl ether, aryl ether, alkyl aryl ether, or a mixture thereof; and $R^2$ may comprise a linear or branched hydrocarbon or aromatic group having from about 1 to about 6 carbon atoms. In choosing a suitable $R^1$ and $R^2$, one should be mindful that if $R^1$ and $R^2$ are both relatively bulky groups, then an adequate gelled liquid hydrocarbon may not form.

The polyvalent metal salts of organophosphonic acid esters or organophosphinic acids of the gelling agents of the present invention may be formed by any suitable method, which will be apparent to those ordinarily skilled in the art upon reading this disclosure. Exemplary techniques are set forth in U.S. Pat. No. 7,328,744, the entire disclosure of which is hereby incorporated by reference.

The phosphor-based hydrocarbon gelling agent may be used to gel any suitable liquid hydrocarbon including, but not limited to, α-olefins, internal olefins, alkanes, aromatic solvents, cycloalkanes, liquefied petroleum gas, kerosene, diesel oil, gas oil (also known as gas condensate), fuel oil, other petroleum distillates, certain mixtures of crude oil, or mixtures thereof. Liquid hydrocarbons that may be specifically designed for use with $CO_2$ are generally preferred in some instances, e.g., a dry gas well. An example of a suitable liquid hydrocarbon designed for use with $CO_2$ is commercially available from the Trysol Corporation of Sundre, Alberta, Canada under the trade name "FRACSOL™".

In certain embodiments, the gelled hydrocarbon treatment fluids may comprise particulate materials like proppant or gravel that can be used in, for example, fracturing or gravel packing operations. Suitable particulate materials include, but are not limited to, graded walnut or other nut shells, resin-coated walnut or other nut shells, graded sand, resin-coated sand, sintered bauxite, various particulate ceramic materials, glass beads, various particulate polymeric materials and the like. The particular size of the particulate material employed may depend on the particular application for which the particulate materials are being used, characteristics of the subterranean formation, characteristics of the particular gelled liquid hydrocarbon treatment fluid being used, as well as other variables. Generally, the particulate sizes may vary in the range of from about 2 to about 200 mesh, U.S. Sieve Series scale. One of ordinary skill in the art with the benefit of this disclosure will be able to choose an appropriate particulate material for a given application.

In the method of the present invention, the gelled liquid hydrocarbon treatment fluid is placed into a location within a subterranean formation and then "broken", that is, after placement, the viscosity of the fluid is reduced. In order to break the fluid, a suitable breaker may be included in or added to the fluid. Any breaker that is able to reduce the viscosity of the gelled liquid hydrocarbon treatment fluid when desired is suitable for use in the compositions and methods of the present invention. In certain preferred embodiments, delayed gel breakers that will react with the treatment fluid after a desired delay period may be used.

Suitable delayed gel breakers can be materials that are slowly soluble in water, those that are encapsulated, or those that are otherwise designed to slowly dissolve in the fluid. In certain preferred embodiments wherein these types of breakers are used, the breaking of the gel does not take place until the slowly soluble breakers are at least partially dissolved in the water. Examples of such slowly soluble breakers are given in U.S. Pat. No. 5,846,915. In some embodiments, hard-burned magnesium oxide, especially that having a particle size which will pass through a 200 mesh Tyler screen, is a preferred delayed gel breaker. Other breakers such as alkali metal carbonates, alkali metal bicarbonates, alkali metal acetates, other alkaline earth metal oxides, alkali metal hydroxides, amines, weak acids and the like can be encapsulated with slowly water soluble or other similar encapsulating materials so as to make them act after a desired delay period. Such materials are well known to those skilled in the art and function to delay the breaking of the gelled liquid hydrocarbon for a required period of time. Examples of water soluble and other similar encapsulating materials that may be suitable include, but are not limited to, porous solid materials such as precipitated silica, elastomers, polyvinylidene chloride (PVDC), nylon, waxes, polyurethanes, polyesters, cross-linked partially hydrolyzed acrylics and the like. Of the slowly soluble or encapsulated breakers mentioned, hard-burned magnesium oxide, which may be commercially available from Clearwater Inc. of Pittsburgh, Pa., is preferred. In certain embodiments, when a polyvalent metal salt of an organophosphonic acid ester and an alkaline breaker are used, e.g., magnesium oxide, an initial increase in the viscosity of the gelled hydrocarbon liquid may be achieved, after which the gel is broken. If used, the delayed gel breaker may be present in the gelled hydrocarbon liquids of the present invention in an amount in the range of from about 0.01% to about 3% w/v, more preferably in an amount in the range of from about 0.05% to about 1% w/v. "w/v" as used herein refers to the weight of the component based on the volume of the liquid hydrocarbon that is present in the treatment fluid.

Another type of breaker which can be used when the gelling agent is a ferric iron polyvalent metal salt of an organophosphonic acid ester or a ferric iron polyvalent metal salt of the organophosphinic acid is a reducing agent that reduces ferric iron to ferrous iron. Of the various oxidation states of iron, ferric iron is capable of forming a viscosifying coordination salt with an organophosphonic acid ester or organophosphinic acid, therefore the salt may be disassociated by reducing the ferric iron to the ferrous state. The disassociation may cause the gelled liquid hydrocarbon treatment fluid to break. Examples of reducing agents which can be used include, but are not limited to, stannous chloride, thioglycolic acid, hydrazine sulfate, sodium diethyldithiocarbamate, sodium dimethyldithiocarbamate, sodium hypophosphite, potassium iodide, hydroxylamine hydrochloride, 2-mercaptoethanol, ascorbic acid, sodium thiosulfate, sodium dithionite, and sodium sulfite. Of these, the preferred reducing agents for use at a temperature of about 90° F. are stannous chloride, thioglycolic acid, hydrazine sulfate, sodium diethyldithiocarbamate, and sodium dimethyldithiocarbamate. The most preferred reducing agent is thioglycolic acid, which may be delayed by salt formation or encapsulation. As mentioned above in connection with other breakers that can be used, the reducing agent used also can be delayed by encapsulating it with a slowly water soluble or other similar encapsulating material. If used, the gel breaker is generally present therein in an amount in the range of from about 0.01% to about 3% w/v, more preferably in an amount in the range of from about 0.05% to about 1% w/v.

Gelled liquid hydrocarbon treatment fluids of the present invention may be prepared in advance or at the well site. In an example of an on-site method, an organophosphonic acid ester or an organophosphinic acid may be added to a suitable amount of an activator composition that comprises a source of polyvalent metal ions so as to form a gelling agent comprising polyvalent metal salt of an organophosphonic acid ester or a polyvalent metal salt of an organophosphinic acid. This may be done in a liquid hydrocarbon fluid so that the resultant gelling agent may gel the liquid hydrocarbon fluid. In certain embodiments, the ratio of metal to phosphorus in the gelled liquid hydrocarbon treatment fluid should be about 1:3; in other embodiments, the metal to phosphorus ratio may be about 2:3.

A gelling agent of the present invention that comprises a polyvalent metal salt of an organophosphonic acid ester or a polyvalent metal salt of an organophosphinic acid may be formed off-site and then added to the liquid hydrocarbon at the well site so as to form a gelled liquid hydrocarbon treatment fluid. In an example of such a method, the polyvalent metal salt may be prepared by any method that is suitable for forming solid salt particulates (e.g., flakes, pellets, or other particulates) that later can be introduced to a liquid hydrocarbon fluid. The polyvalent metal salt particulates may be transported to the well site where they can be added to a liquid hydrocarbon fluid. In some embodiments of such methods, the liquid hydrocarbon fluid may be pre-gelled or partially gelled using any suitable technique. In one embodiment of such a technique, after the salt particulates are added to the liquid hydrocarbon fluid, no significant increase in the viscosity of the liquid hydrocarbon fluid may be realized until the temperature of the fluid is sufficient to enable the salt particulates to dissolve in the liquid hydrocarbon fluid to eventually increase its viscosity.

Another method of preparing a gelled liquid hydrocarbon treatment fluid of the present invention comprises forming an initial liquid hydrocarbon gel by adding a gelling agent that comprises a polyvalent metal salt of an organophosphonic acid ester or a polyvalent metal salt of an organophosphinic acid to a liquid hydrocarbon fluid to form an initial gel. At a desired time, an additional quantity of a gelling agent that may comprise a polyvalent metal salt of an organophosphonic acid ester or a polyvalent metal salt of an organophosphinic acid may be added to the initial gel, for example, as it is pumped into a well bore penetrating a subterranean formation, to form a more viscous gel.

Another example of a method for forming the gelled liquid hydrocarbon treatment fluids of the present invention involves preparing a liquid hydrocarbon gel having a high concentration of a polyvalent metal salt of an organophosphonic acid ester or a polyvalent metal salt of an organophosphinic acid. This gel may be highly viscous. This highly viscous gel may be prepared off-site and then delivered to the location of use at a desired time. At the location, the highly viscous gel may be diluted with a hydrocarbon if desired for use (for instance, if the gel is to be used in a fracturing or sand control treatment method).

Although certain methodologies of making a gelled liquid hydrocarbon treatment fluid of the present invention have been discussed in detail, the order of addition of each component is not critical, and therefore, other methods are suitable as well.

A preferred gelled liquid hydrocarbon composition suitable for use in the methods of this invention comprises a hydrocarbon liquid and a gelling agent that comprises a polyvalent metal salt of an organophosphonic acid ester or a polyvalent metal salt of an organophosphinic acid. The gelled liquid hydrocarbon composition may comprise water and/or a base. The gelled liquid hydrocarbon composition optionally may comprise an enhancer and/or a breaker. In certain embodiments, the enhancer comprises a surfactant. In certain embodiments, the breaker is a delayed gel breaker. The delayed gel breaker may comprise a reducing agent that is capable of reducing ferric iron to ferrous iron, and it may be encapsulated with a slowly water soluble or other similar encapsulating material.

A preferred hydrocarbon liquid gelling agent suitable for use in the methods of this invention comprises a ferric iron or aluminum polyvalent metal salt of an organophosphonic acid ester, the organophosphonic acid ester having the formula:

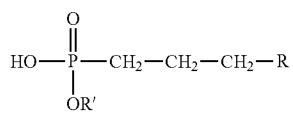

where R represents a hydrocarbon group having the general formula $C_nH_{2n+1}$, where n is from about 3 to about 21 and R' preferably is methyl or ethyl, or an organophosphinic acid having the formula:

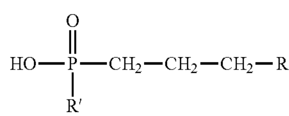

where R represents a linear or branched alkyl chain having the general formula $C_nH_{2n+1}$, where n is from about 1 to about 21, and R' preferably is a methyl or ethyl.

A preferred hydrocarbon liquid gelling agent suitable for use in the methods of this invention comprises a ferric iron polyvalent metal salt of an organophosphonic acid ester, the ester having the formula:

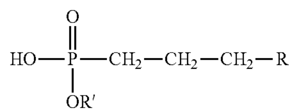

where R represents a linear or branched alkyl chain having the general formula $C_nH_{2n+1}$, where n is from about 1 to about 21 and R' preferably is a methyl or ethyl group, or an organophosphinic acid having the formula:

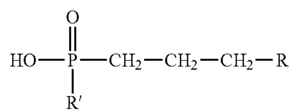

where R represents a linear or branched alkyl chain having the general formula $C_nH_{2n+1}$, where n is from about 1 to about 21 and R' preferably is a methyl or ethyl group.

The methods of the present invention may be used with fracturing methods, performing a sand control treatment (e.g., gravel packing), providing a plugging agent (e.g., pill), providing a well bore cleanup fluid, performing a viscous sweep, a matrix squeeze, or providing an insulating fluid, frac-packing methods, or any other methods wherein gelled hydrocarbon fluids are used in formations that may be prone to scale damage. The methods of the present invention are most advantageous when used in an operation in that treats an area of a wellbore or formation from or through which formation fluids will later be produced. Using a phosphor-based hydrocarbon gelling agent as a scale inhibitor allows the scale inhibitor to be placed during an already-planned treatment rather than having to place a scale inhibitor as a secondary treatment. Moreover, since the scale inhibitor is placed as the fluid viscosity is broken, the scale inhibitor is self-diverting, that is it is placed in a desired location as a function of another treatment. In addition, phosphor-based hydrocarbon gelling agents are relatively insoluble in water and gas and so they may act better as long-term inhibitors in water and or gas wells.

An exemplary method of the present invention of treating a subterranean formation comprises the steps of: providing a gelled liquid hydrocarbon treatment fluid comprising a gelling agent that comprises a phosphor-based hydrocarbon gelling agent (which may be either a polyvalent metal salt of an organophosphonic acid ester, a polyvalent metal salt of an organophosphinic acid, or some combination thereof), treating a portion of a subterranean formation with the gelled liquid hydrocarbon treatment fluid, breaking the gelled liquid hydrocarbon treatment fluid wherein breaking the fluid acts to reduce the viscosity of the treatment fluid and to release the phosphor-based hydrocarbon gelling agent, and allowing at least a portion of the phosphor-based hydrocarbon gelling agent to remain in the subterranean formation wherein the phosphor-based hydrocarbon gelling agent then acts as a scale inhibitor. That is, the phosphor-based hydrocarbon gelling agents suitable for use in the present invention are capable of not only gelling the treatment fluid but also of acting as a scale inhibitor within the formation after the treatment is complete. Advantageously, the phosphor-based hydrocarbon gelling agent are often able to increase the viscosity of the hydrocarbon treatment fluid to such an extent that additional cross-linking agents are not necessary to achieve a desired viscosity. The gelling agent that comprises a polyvalent metal salt of the organophosphonic acid ester or a polyvalent metal salt of an organophosphinic acid is preferably present in the treatment fluid in an amount in the range of from about 0.1% to about 10% w/v, more preferably from about 0.1% to about 5% w/v, more preferably from about 0.2% to about 2.5% w/v.

In some preferred embodiments, the methods of the present invention are performed entirely or partially at matrix flow rates. In embodiments wherein only a portion of the treatment is performed at matrix flow rates, it is desirable to have at least 25% of the total placement of the fluid placed at matrix flow rates, preferably 50%, and more preferably 75%. In such fracturing operations it may be further preferred that no particulates be placed during the matrix flow portion of the operation. As used herein, the term "matrix flow rate" means a flow rate that is high enough to allow the fluid to move through the matrix of particulates within the formation but below that which will form or enhance fractures in the formation. Other operations, such as squeeze operations are well-suited to be performed at 100% matrix flow rates and may be particularly desirable for use with the present invention.

In a fracturing treatment fluid embodiment, phosphor-based hydrocarbon gelling agent may be combined with an activator composition that comprises a source of polyvalent metal ions to gel the liquid hydrocarbon. In certain embodiments, the polyvalent metal salt of the organophosphonic acid ester or the polyvalent metal salt of the organophosphinic acid may be added in an amount in the range of from about 0.1% to about 10% w/v, preferably from about 0.1% to about 5% w/v, more preferably from about 0.2% to about 2.5% w/v. Optionally, a fracturing fluid of the present invention may comprise water and/or a base to achieve a desired gel. A fracturing fluid of the present invention also may comprise proppant. In certain embodiments, the proppant material may be present in the fluid in an amount in the range of from about 1 to about 32 pounds of proppant material per gallon of liquid hydrocarbon, more preferably in the range of about 1 to about 22 pounds per gallon. A suitable delayed gel breaker may be present in the treatment fluid in an amount in the range of from about 0.01% to about 3% w/v, more preferably in an amount in the range of from about 0.05% to about 1% w/v.

In a gravel pack treatment fluid embodiment, a gelling agent comprising a polyvalent metal salt of an organophosphonic acid ester or a polyvalent metal salt of an organophosphinic acid may be added to the liquid hydrocarbon in an amount in the range of from about 0.1% to about 10% w/v, preferably from about 0.1% to about 5% w/v, more preferably from about 0.2% to about 2.5% w/v. The gravel pack treatment fluid of the present invention may further comprise water and or a base to achieve a desired gel. In certain embodiments, the gelling agent may be present in the gelled liquid hydrocarbon gravel pack fluid in an amount in the range of from about 0.01% to about 3% w/v, more preferably in an amount in the range of from about 0.05% to about 1% w/v. In certain embodiments, the gravel particulates may be present in the fluid in an amount in the range of from about 1 to about 32 pounds of proppant material per gallon of liquid hydrocarbon, more preferably in the range of about 1 to about 22 pounds per gallon. A suitable delayed gel breaker may be present in the gelled liquid hydrocarbon gravel pack fluid in an amount in the range of from about 0.01% to about 10% w/v, more preferably in an amount in the range of from about 0.05% to about 3% w/v.

In order to further illustrate the methods and composition of the present invention, the following examples are given. In no way should such examples be read to limit or define the scope of the invention.

EXAMPLES

Instantaneous scale formation was tested under Miller Field (North Sea) conditions. Miller Field is known to have scale problems when the formation brine mixed with sea water. The test was conducted by creating a test Miller Filed formation water and a test Miller Filed sea water having the following compositions:

| Formation Water (per 1 L) | Sea Water (per 1 L) |
|---|---|
| 0.24 g $BaCl_2 \times 2\ H_2O$ | 1.06 g $CaCl_2 \times 2\ H_2O$ |
| 6.06 g $SrCl_2 \times 6\ H_2O$ | 11.8 g $MgC_2 \times 6\ H_2O$ |
| 89.4 g NaCl | 0.02 g $SrCl_2 \times 6\ H_2O$ |
| 52.94 g $CaCl_2 \times 2\ H_2O$ | 0.8 g KCl |
| 15.06 g $MgCl_2 \times 6\ H_2O$ | 4.14 g $Na_2SO4$ |
| | 0.2 g $NaHCO_3$ |
| | 24.8 g NaCl |

Three tests were conducted. The first test involved combining the formation water and the sea water with no inhibitor while the mixture was being stirred, this test was observed visually and displayed instant turbidity. In addition, the first test was monitored using a Cole-Palmer Spectrophotometer 1200 at 860 nm, the results of which can be seen in FIG. 1. For the second test 100 ppm of isopropyl octanephosphonic acid was added to the formation water and then the sea water was added while the mixture was being agitated, this test was observed visually and showed that turbidity was delayed by approximately two minutes. For the third test 100 ppm of ethyl octanephosphonic acid was added to the formation water and then the sea water was added while the mixture was being agitated, this test was observed visually and showed that turbidity was delayed by approximately two minutes. In addition, the third test was monitored using a Cole-Palmer Spectrophotometer 1200 at 860 nm, the results of which can be seen in FIG. 1.

Thus, the present invention is well adapted to carry out the objects and attain the benefits and advantages mentioned as well as those which are inherent therein. While numerous changes to the methods and compositions can be made by those skilled in the art, such changes are encompassed within the spirit of this invention as defined by the appended claims.

What is claimed is:

1. A method of inhibiting scale formation comprising:

providing a gelled liquid hydrocarbon treatment fluid comprising a liquid hydrocarbon and a phosphor-based hydrocarbon gelling agent;

placing the treatment fluid into a portion of a subterranean formation wherein at least a portion of the placement is performed at matrix flow rates; and, allowing at least a portion of the phosphor-based hydrocarbon gelling agent to remain in the subterranean formation wherein the phosphor-based hydrocarbon gelling agent then acts to reduce the formation of scale.

2. The method of claim 1 wherein substantially all of the treatment fluid is placed into the subterranean formation at matrix flow rates.

3. The method of claim 1 wherein the liquid hydrocarbon is selected from the group consisting of: an a-olefin, an internal olefin, an alkane, an aromatic solvent, a cycloalkane, liquefied petroleum gas, kerosene, diesel oil, gas oil, fuel oil, a petroleum distillate, a crude oil mixture, any mixture thereof, and any combination thereof.

4. The method of claim 1 wherein the phosphor-based hydrocarbon gelling agent is selected from the group consisting of: a polyvalent metal salt of an organophosphonic acid ester, a polyvalent metal salt of an organophosphinic acid, any mixture thereof, and any combination thereof.

5. The method of claim 4 wherein the polyvalent metal salt of an organophosphonic acid ester is formed from a source of polyvalent metal ions and an organophosphonic acid ester, the organophosphonic acid ester having the formula:

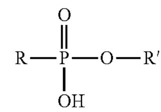

wherein R or R' comprises a hydrocarbon group having about 1 to about 30 carbon atoms, wherein the hydrocarbon group is selected from the group consisting of: a linear or branched alkyl, alkenyl, aryl, alkylaryl, arylalkyl, cycloalkyl, alkyl ether, aryl ether, alkyl aryl ether, any mixture thereof, and any combination thereof; and R or R' comprises a hydrocarbon group having from about 1 to about 6 carbon atoms.

6. The method of claim 5 wherein the polyvalent metal ions is selected from the group consisting of: aluminum ions, gallium ions, lanthanum ions, ruthenium ions, iron ions, lanthanide rare earth series ions, and any combination thereof.

7. The method of claim 5 wherein the polyvalent metal ions comprise ions having a +3 oxidation state.

8. The method of claim 4 wherein the polyvalent metal salt of an organophosphinic acid is a source of polyvalent metal ions and an organophosphinic acid, the organophosphinic acid having the formula:

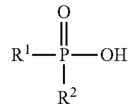

wherein $R^1$ or $R^2$ comprises a hydrocarbon group having about 1 to about 30 carbon atoms, wherein the hydrocarbon group is selected from the group consisting of: a linear or branched alkyl, alkenyl, aryl, alkylaryl, arylalkyl, cycloalkyl, alkyl ether, aryl ether, alkyl aryl ether, any mixture thereof, and any combination thereof; and $R^1$ or $R^2$ comprises a hydrocarbon group having from about 1 to about 6 carbon atoms.

9. The method of claim 8 wherein the source of polyvalent metal ions is selected from the group consisting of: aluminum ions, gallium ions, lanthanum ions, ruthenium ions, iron ions, lanthanide rare earth series ions, and any combination thereof.

10. The method of claim 8 wherein the polyvalent metal ions comprise ions having a +3 oxidation state.

11. The method of claim 1 wherein the gelled liquid hydrocarbon treatment fluid comprises a surfactant.

12. The method of claim 11 wherein the surfactant is selected from the group consisting of: an imidazoline, a fatty acid soap, a fatty acid, a dioctyl sulphosuccinate, a sodium alkyl benzene sulphonate, a fatty acid ester, a fatty acid alkanolamide, an amido betaine, and any combination thereof.

13. The method of claim 1 wherein treating the subterranean formation involves fracturing a portion of the subterranean formation.

14. The method of claim 13 wherein the gelled liquid hydrocarbon treatment fluid comprises proppant.

15. The method of claim 1 wherein treating the subterranean formation involves providing sand control to at least a portion of the subterranean formation.

16. The method of claim 15 wherein the gelled liquid hydrocarbon treatment fluid comprises gravel.

17. The method of claim 1 wherein the gelled liquid hydrocarbon treatment fluid further comprises a breaker, the breaker being present in an amount sufficient to break the viscosity of the gelled liquid hydrocarbon treatment fluid at a desired time.

18. The method of claim 17 wherein the breaker comprises a delayed gel breaker.

19. The method of claim 17 wherein the breaker is selected from the group consisting of: a hard burned magnesium oxide, an alkali metal carbonate, an alkali metal bicarbonate, an alkali metal acetate, an alkaline earth metal oxide, an alkali metal hydroxide, an amine, a weak acid, and any combination thereof.

* * * * *